US012312055B1

United States Patent
Lin et al.

(10) Patent No.: US 12,312,055 B1
(45) Date of Patent: May 27, 2025

(54) MULTI-MODAL ROBOT SYSTEM CAPABLE OF REALIZING AUTONOMOUS SUBMARINE DOCKING AND RECONSTRUCTION

(71) Applicant: ZHEJIANG UNIVERSITY, Hangzhou (CN)

(72) Inventors: Mingwei Lin, Hangzhou (CN); Shuguang Chu, Hangzhou (CN); Ri Lin, Hangzhou (CN); Canjun Yang, Hangzhou (CN); Dejun Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/959,498

(22) Filed: Nov. 25, 2024

(30) Foreign Application Priority Data

Aug. 28, 2024  (CN) .......................... 202411188493.6

(51) Int. Cl.
*B63G 8/00* (2006.01)
*B60L 53/12* (2019.01)
*B63G 8/24* (2006.01)

(52) U.S. Cl.
CPC .............. *B63G 8/001* (2013.01); *B60L 53/12* (2019.02); *B63G 8/24* (2013.01); *B60L 2200/32* (2013.01);
(Continued)

(58) Field of Classification Search
CPC .... B63G 8/001; B63G 8/24; B63G 2008/004; B63G 2008/008; B60L 53/12; B60L 2200/32
See application file for complete search history.

(56) References Cited

U.S. PATENT DOCUMENTS

| 5,579,285 A * | 11/1996 | Hubert | G01S 11/14 367/133 |
| 8,047,149 B1 * | 11/2011 | Antonelli | B63G 8/001 114/230.1 |
| 2019/0100292 A1 * | 4/2019 | Austin | B63G 8/22 |

FOREIGN PATENT DOCUMENTS

| CN | 110386238 A | | 10/2019 | |
| KR | 20140055571 | * | 5/2014 | ............. B65H 75/34 |
| KR | 20200047182 | * | 5/2020 | ............... B63G 8/14 |

OTHER PUBLICATIONS

Lin et al, R. A non-contact docking system for charging and recovering autonomous undertwater vehicle, Google Scholar, Journal of Marine Sceince and Technology, 2019, pp. 902-916. (Year: 2019).*

(Continued)

*Primary Examiner* — Russell Frejd
(74) *Attorney, Agent, or Firm* — Jiwen Chen; Joywin IP Law PLLC

(57) ABSTRACT

A multi-modal robot system capable of realizing autonomous submarine docking and reconstruction, includes a non-contact charging platform, several functional modules and a docking robot, wherein a coil is arranged on the non-contact charging platform, and energy and signals are transmitted between the coil and the functional modules; each of the functional modules includes a propeller module, an energy module, an observation detection module, an operation tool module, a navigation control module, a bow detection module and a tail propulsion module; and according to an instruction of a docking and reconstruction task, the docking robot reconstructs a multi-modal underwater robot by docking specific functional modules. The multi-modal robot system of the present invention can reconstruct the operation modal of the robot according to actual needs, realize the reconstruction and assembly of the underwater (Continued)

robot with three motion modes of horizontal plane cruise, fixed-point operation and vertical profiling, and reduce cost.

9 Claims, 2 Drawing Sheets

(52) U.S. Cl.
CPC .. *B63G 2008/004* (2013.01); *B63G 2008/008* (2013.01)

(56) References Cited

OTHER PUBLICATIONS

Liu et al, J. A review of underwater docking and charging technology for autonomous vehicles, Google Scholar, Sciencedirect, Ocean Engineering, vol. 297, Apr. 2024, pp. 1-18. (Year: 2024).*

Hu et al, J. Design of a Docking & Charging Device for Unmanned Surface Vehicle (USV), Google Scholar, 2023 2nd International Conference on Electrical Engineering, Big Data and Algorithms (EEBDA), Feb. 2023, pp. 915-920. (Year: 2023).*

Li et al, D. Autonomous underwater vehicle docking system for cabled ocean observatory network, Google Scholar, Sciencedirect, Ocean Engineering, vol. 109, Nov. 2015, pp. 127-134. (Year: 2015).*

Ishibashi et al, S. The Underwater Recharge Docking System for an Autonomous Underwater Robot Applying Visual Information, Google Scholar, The 7th Annual IEEE International Conference on Cyber Technology in Automation, Control and Intelligent Systems, Jul.-Aug. 2017, pp. 127-130. (Year: 2017).*

Vasilescu et al, I. Autonomous Modular Optical Underwater Robot (AMOUR) Design, Prototype and Feasibility Study, Google Scholar, Proceedings of the 2005 IEEE International Conference on Robotics and Automation, Apr. 2005, pp. 1603-1609. (Year: 2005).*

KR20200047182 Abstract Translation (Year: 2020).*
KR20140055571 Translation (Year: 2014).*

* cited by examiner

MULTI-MODAL ROBOT SYSTEM CAPABLE OF REALIZING AUTONOMOUS SUBMARINE DOCKING AND RECONSTRUCTION

FIELD OF TECHNOLOGY

The present invention relates to the technical field of a submarine robot, in particular to a multi-modal robot system capable of realizing autonomous submarine docking and reconstruction.

BACKGROUND TECHNOLOGY

Autonomous underwater vehicles (AUVs), remote operated vehicles (ROVs) and underwater gliders are three types of mature underwater robots, which can respectively perform large-scale cruise, fixed-point operation and profile monitoring tasks. However, the three types of robots have a small cross range of functions, only one type of underwater robot cannot meet needs of construction of a submarine space station, and supporting various types of underwater robots has high operation, maintenance and deployment costs.

Currently, common multi-modal underwater robots at home and abroad comprise ARVs (AUV and ROV combinations) and hybrid gliders (AUV and glider combinations), which can complete different work tasks by changing motion states, such as centroid adjustment and propulsion mode switching, and enrich working ability of a single-modal underwater robot. For example, a Chinese patent document with a public number CN110386238A discloses a full-sea depth ARV underwater robot structure, comprising a cabin body, a starboard vertical propeller, a larboard vertical propeller, rotating rudder plate assemblies, main thrust motors, an underwater and water surface communication positioning system, optical and acoustic detection systems and an operating device. The two side of a bow of the cabin body are respectively provided with the starboard vertical propeller and the larboard vertical propeller, the two sides of a stern of the cabin body are both provided with the rotating rudder plate assembly and the main thrust motor to provide horizontal navigation power for a carrier, a top of the cabin body is provided with the underwater and water surface communication positioning system, a bottom thereof is provided with the optical detection system and the acoustic detection system, and interior of the cabin body is provided with the operating device.

The Houston Mechatronics Inc. has launched Aquanaut, a variable structure underwater robot capable of performing submarine operation services comprising inspection, maintenance, repair and drilling support. The Aquanaut relies on propellers for efficient cruise during long-range cruise, and transforms out an operating robot arm during near-end operation while hovering and stabilizing with full attitude control. It is a rare underwater robot with a variable shape structure. However, no matter what type of multi-modal underwater robot, in order to achieve the optimal comprehensive performance, it is often necessary to sacrifice the working performance under a single mode, which is reflected in increase of a load and water resistance. In addition, to enable a single robot to have a plurality of functions, it is often necessary to configure different types of sensors or working tools, which makes the robot larger, and these sensors or working tools do not need to be used at the same time. Thus, when performing a task, unused sensors bring additional energy consumption to the underwater robot.

Therefore, through exploration of underwater multi-modal robot technology with submarine in-situ function reorganization and with autonomous docking and reconstruction, submarine power exchange and other technologies, the underwater robot can realize the switch of different functions and modes in seabed, and improve working efficiency.

SUMMARY OF THE INVENTION

The present invention provides a multi-modal robot system capable of realizing autonomous submarine docking and reconstruction, which can construct three types of underwater robots: a torpedo-type cruising robot, a fixed-point hovering robot and a vertical profiling robot, and can perform autonomous assembly of different functions according to requirements.

The technical schemes of the present invention are as follows:

A multi-modal robot system capable of realizing autonomous submarine docking and reconstruction, comprising a non-contact charging platform, several functional modules and a docking robot;

a coil is arranged on the non-contact charging platform, and energy and signals are transmitted between the coil and the functional modules;

a coil and a permanent magnet are arranged in a docking surface of each functional module, and adjacent docking functional modules are adsorbed with each other by the permanent magnets during the docking and reconstruction, and are separated by means of an electromagnetic force which is repulsive to an adsorption force of the permanent magnets and is generated by energizing the coils;

each of the functional modules comprises an energy module, a propeller module, an observation/detection module, an operation tool module, a navigation/control module, a bow module and a tail module; and according to an instruction of a docking and reconstruction task, the docking robot reconstructs a multi-modal underwater robot by docking a plurality of functional modules with specific functions.

The energy module provides power for the underwater robot; the propeller module provides a vertical or horizontal propulsion force for the underwater robot; the observation/detection module performs environmental monitoring; the operation tool module is configured to perform a submarine operation of the underwater robot; the navigation/control module gives location information of the underwater robot in real time, and performs task planning and control on the underwater robot; the bow module is configured to construct a head of a torpedo-type robot; and the tail module is configured to construct a tail of the torpedo-type robot.

The energy module is equipped with a permanent magnet and a coil on each side, the energy module comprises a battery pack, a DC-DC module, an inverter and a transmitting resonance circuit, and the battery pack supplies power to the inverter after voltage regulation by the DC-DC module to generate square waves, which are transmitted to the coil through waveform regulation of the transmitting resonance circuit.

The propeller module comprises a vertical propeller and a horizontal propeller.

The observation/detection module comprises a camera, an inertial sensor (IMU, inertial measurement unit), a conductivity temperature depth (CTD), a multi-beam imaging sonar and other environmental monitoring sensors.

The operation tool module comprises a common underwater operation tool such as a rigid manipulator or a soft claw, which is configured to perform functions such as operation, maintenance and operating of a submarine facility, or capture of an underwater target.

The navigation control module comprises an inertial navigation system, an electronic compass, a depth sensor and a transceiver of an ultra-short baseline positioning system, which can give positioning information of the underwater robot in real time; and the navigation/control module also comprises an underwater robot controller for task planning and control of the robot.

The bow module is configured to perform head construction of the torpedo-type robot, mainly plays a role of flow diversion and drag reduction, and also comprises a camera and other detection sensors.

The tail module comprises two horizontally mounted propellers that regulate forward and backward motions and heading of the torpedo-type underwater robot.

The energy module is equipped with a permanent magnet and a coil on each side, and the other functional modules are only equipped with a permanent magnet and a coil on an adsorption surface. The permanent magnet is on the inside, the coil is on the outside, and a distance between the coil and an end face is not more than 3 mm.

Preferably, a standby controller is provided inside each functional module; and when other functional modules dock the energy module, the standby controller is waked up.

Each functional module is in a self-sealed state.

In addition to the energy module, each of the other functional modules comprises a rectifier that convert energy received by a coil thereof into direct current to supply power to an internal device thereof.

When detecting that the energy module above is low in power, the non-contact charging platform automatically charge the energy module wirelessly.

Preferably, the docking robot comprises a permanent magnet, a control center, and an antenna controlled by the control center, a buoyancy regulating device, an energy and signal manager, a propeller, a coil, and a battery pack, wherein:
  the control center comprises a controller and a navigation sensor (inertial navigation, an electronic compass, and a pressure sensor), and communicates with a shore base station through the antenna, and specific functional modules are docked and reconstructed through coordination of the permanent magnet and the coil according to the instruction of the docking and reconstruction task;
  the buoyancy regulating device is installed in a top permeable tank to regulate buoyancy of the docking robot through a buoyancy force;
  the energy and signal manager is configured to regulate the energy and the signal transmitted by the coil;
  the propeller comprises a vertical propeller and a horizontal propeller, which are configured to regulate a vertical motion and a horizontal motion of the docking robot respectively; and
  the coil transmits the electrical energy and signal when an alternating current is applied thereto, and the coil generates the electromagnetic force opposite to the adsorption force of the permanent magnet when a direct current is applied thereto, and then the functional modules adsorbed by the permanent magnet are separated.

Preferably, at least 3 horizontal propellers exist in the docking robot, which are uniformly distributed around an axis of the docking robot.

Further and preferably, the buoyancy regulating device comprises a flexible air bag and a pressure gas cylinder wrapped in the flexible air bag, a mouth of the pressure gas cylinder is equipped with a first solenoid valve, the flexible air bag has an exhaust port, and the exhaust port is equipped with a second solenoid valve.

An outer side of the air bag is directly in contact with water, and the pressure gas cylinder is deflated through the first solenoid valve, so that the air bag floats as a drainage volume thereof increases; and when it is necessary to dive, gas inside the air bag is discharged through the second solenoid valve.

A minimum pressure of the pressure gas cylinder is greater than a maximum working water depth pressure of the docking robot; and when the pressure of the pressure gas cylinder is lower than a safety threshold, the docking robot needs to inflate and pressurize the pressure gas cylinder through an air compressor on the water surface.

Preferably, the autonomous docking and reconstruction method comprises:
  (1) after receiving an instruction of reconstructing the robot, the docking robot is guided to approach the platform through a acoustic beacon of the non-contact charging platform;
  (2) with assistance of a visual system, the docking robot looks for a specified functional module, and after finding the module, the docking robot performs a visual servo descent control until a depth thereof is unable to change any more;
  (3) the docking robot transmits a high-frequency modulation signal through the coil, and a coil of the specified functional module receives an induced magnetic field and generates an induced voltage; the permanent magnet of the docking robot and a permanent magnet of the specified functional module adsorb each other; the adsorption is considered to be in place when the induced voltage reaches a specific value, and the functional module returns an adsorption-in-place signal through the coil; and the docking robot moves the adsorbed functional module to a specified location and closes the propeller;
  (4) the docking robot applies the direct current to the coil to generate the electromagnetic repulsion force so as to separate the adsorbed functional module and look for a next functional module to be assembled; and
  (5) steps (2)-(4) are repeated until the docking and reconstruction of each functional module of a specified modal robot is completed.

The docking robot can profile and can be used as a vertical profiling robot to perform profile detection task.

The multi-modal robot system capable of realizing autonomous submarine docking and reconstruction in the present invention comprises:
  a cruise robot, which is configured to perform a wide range of cruise tasks;
  a fixed-point hovering robot, which is configured to perform a fixed-point hovering operation; and
  a vertical profiling robot, which is configured to perform a profile detection task.

The cruise robot comprises a bow detection module, a vertical propulsion module, a navigation control module, an energy module, a vertical propulsion module and a tail propulsion module that are docked in turn.

a docking and reconstruction manner of the cruise robot is as follows: based on the energy module, the navigation control module, the vertical propeller module, the bow detection module and the tail propulsion module are adsorbed successively.

The fixed-point hovering robot comprises:

an energy module;

four propeller modules adsorbed around the energy module, each of the propeller modules comprising two vertical propellers and two horizontal propellers, wherein the propellers of the same type are centrosymmetric about the energy module; and a navigation control module, an observation/detection module or an operation tool module adsorbed at a top of the energy module.

A docking and reconstruction manner of the fixed-point hovering robot is as follows: based on the energy module, the four propeller modules are adsorbed and jointed around the energy module successively, of which two are the vertical propellers and two are the horizontal propellers, wherein the propellers of the same type are centrosymmetric about the energy module; and then the navigation control module, the observation/detection module or the operation tool module are jointed at the top of the energy module.

Compared with the prior art, the beneficial effects of the present invention are:

(1) the multi-modal robot system capable of realizing autonomous submarine docking and reconstruction in the present invention can reconstruct the operation modal of the robot according to actual needs, realize the reconstruction and assembly of the underwater robot with three motion modes of horizontal plane cruise, fixed-point operation and vertical profiling, and reduce a construction cost of a submarine space station robot system; and (2) the multi-modal robot system capable of realizing autonomous submarine docking and reconstruction in the present invention can realize the autonomous adsorption and separation control of the functional modules of the underwater robot, and adopts non-contact battery replacement, operation and maintenance and use method, which saves waiting time of charging the robot underwater, and improves the working efficiency and energy utilization rate of the underwater robot.

DESCRIPTION OF THE EMBODIMENTS

The present invention is described in further detail below in conjunction with the drawings and embodiments. It should be noted that the embodiments below are intended to facilitate the understanding of the present invention and do not have any limiting effect on it.

Figure 1:
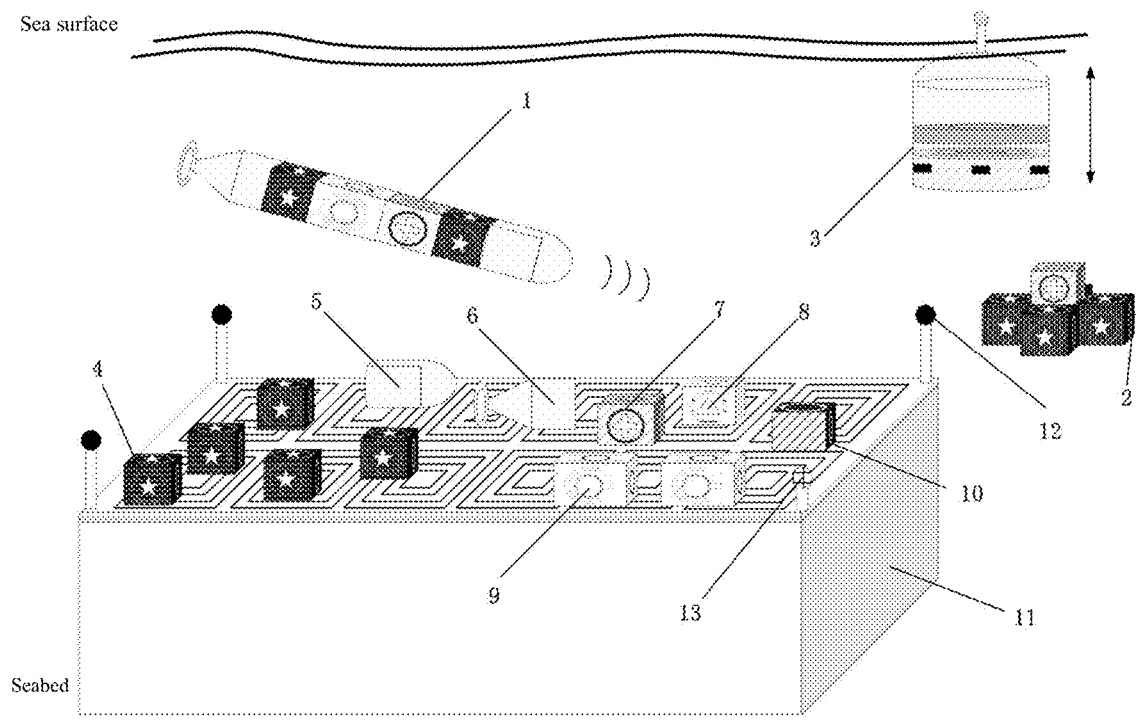
FIG. 1 is a composition diagram of a multi-modal robot system capable of realizing autonomous submarine docking and reconstruction.

As shown in FIG. 1, a non-contact charging platform 11 is arranged on the seabed, and coils are uniformly arranged on the platform, which can perform energy and signal transmission. The platform is adsorbed with an energy module 9, a propeller module 4, an observation/detection module 10, an operation tool module 8, a navigation control module 7, and a bow module 5 and a tail module 6 of an underwater robot.

All other functional modules on the platform except the bow module 5 and the tail module 6 of the underwater robot are in a rectangular shape. The energy module 9 is equipped with a permanent magnet and a planar coil on each side. The coil is on the outer side and the permanent magnet is on the inner side. Each of the other functional modules is only equipped with a planar coil and a permanent magnet on an adsorption surface. Magnetic poles of two opposite surfaces of each functional module are opposite, and magnetic poles of each functional module are in a certain angle relationship with a pattern of a top surface of the module. A mode C robot 3 can confirm its magnetic pole direction by recognizing the pattern on the top of the functional module, and then perform adsorption and jointing of the functional module.

The energy module 9 is consisted of a battery pack, a DC-DC module, an inverter and a transmitting resonance circuit, and the battery pack supplies power to the inverter after voltage regulation by the DC-DC module to generate square waves, which are transmitted to the coil through waveform regulation of the transmitting resonance circuit.

The propeller module 4 mainly comprises two types of vertical and horizontal propellers, which provide power for the robot to move in different directions.

The observation/detection module 10 comprises a camera, an inertial sensor (IMU, inertial measurement unit), a conductivity temperature depth (CTD), a multi-beam imaging sonar and other environmental monitoring sensors.

The operation tool module 8 comprises a common underwater operation tool such as a mechanical arm hand or a soft claw, which is configured to perform functions such as operation, maintenance and operating of a submarine facility, or capture of an underwater target.

The navigation control module 7 comprises an inertial navigation system, an electronic compass, a depth sensor and a transceiver of an ultra-short baseline positioning system, which can give positioning information of the underwater robot in real time; and the module comprises an underwater robot controller for task planning and control of the robot.

The bow module 5 of the underwater robot is configured to perform head construction of the torpedo-type robot, mainly plays a role of flow diversion and drag reduction, and also comprises a camera and other detection sensors.

The tail module 6 of the underwater robot comprises two horizontally mounted propellers that regulate forward and backward motions and heading of the torpedo-type underwater robot.

Each of the above functional modules comprises a standby controller, which is configured to receive a coil signal and transmit a current state signal of the functional module. When each functional module obtains energy through the coil, the standby controller can communicate with other functional modules in real time, and the communication signal is transmitted through a form of a high-frequency carrier. Each functional module is in a self-sealed state.

In addition to the energy module, each of the other functional modules comprises a rectifier that convert energy received by a coil into direct current to supply power to an internal device.

When detecting that the energy module 9 above is low in power, the platform 11 automatically performs wireless charging.

The underwater robot can be autonomously reconstructed into three modes, namely, a torpedo-type underwater robot 1 (mode A) that moves in a wide range in a horizontal plane, an underwater robot 2 (mode B) that can hover and observe at a fixed-point, and an underwater robot 3 (mode C) that can shuttle through a profiling motion. The mode C robot forms adsorption and release of a specific functional module through power on-off (direct current) of a bottom coil, and assists in the construction of the two types of robots in the modes A and B.

Steps of in-situ docking and reconstruction of the underwater robot are as follows:

In a first step, the mode C robot 3 is guided by a sound beacon 13 on the submarine charging platform 11 to gradually approach the platform, and is assisted by a visual system to sail to a top of any corner of the platform 11.

In a second step, according to an acoustic assembly instruction issued by the submarine platform 11, the mode C robot 3 looks for a functional module having a specified pattern. When the required module is found, the mode C robot 3 performs visual servo descent control, and determines a magnetic pole direction of the functional module according to a top pattern of the functional module, then regulates its own heading, and continues to descend until a depth of the mode C robot 3 is unable to change any more.

In a third step, the mode C robot 3 transmits a high-frequency modulation signal through the bottom coil, at which time the coil of the functional module can receive an induced magnetic field and generate an induced voltage. If the functional module is adsorbed in place, the induced voltage is a specific value. At this time, the adsorption is considered to be in place, and the functional module returns an in-place signal through the coil; and the mode C robot 3 moves the adsorbed functional module to a specified location and closes the propeller.

In a fourth step, the modal C robot 3 applies the direct current to the coil, and a current direction causes it to generate an electromagnetic repulsion force, and then cause it to be separated from the functional module and look for a next functional module to be assembled.

In a fifth step, steps 2 to 4 are repeated until each module of the robot in the mode A, B or C is docked and assembled.

A docking and reconstruction manner of the functional module of the mode A robot 1 is as follows: taking the energy module 9 as a basis, the navigation control module 7, the propeller module 4, the bow detection module 5 and the tail propulsion module 6 are adsorbed in sequence to form an arrangement sequence of the bow detection module 5, the (vertical) propulsion module 4, the navigation control module 7, the energy module 9, the (vertical) propulsion module 4 and tail propulsion module 5.

Figure 2:
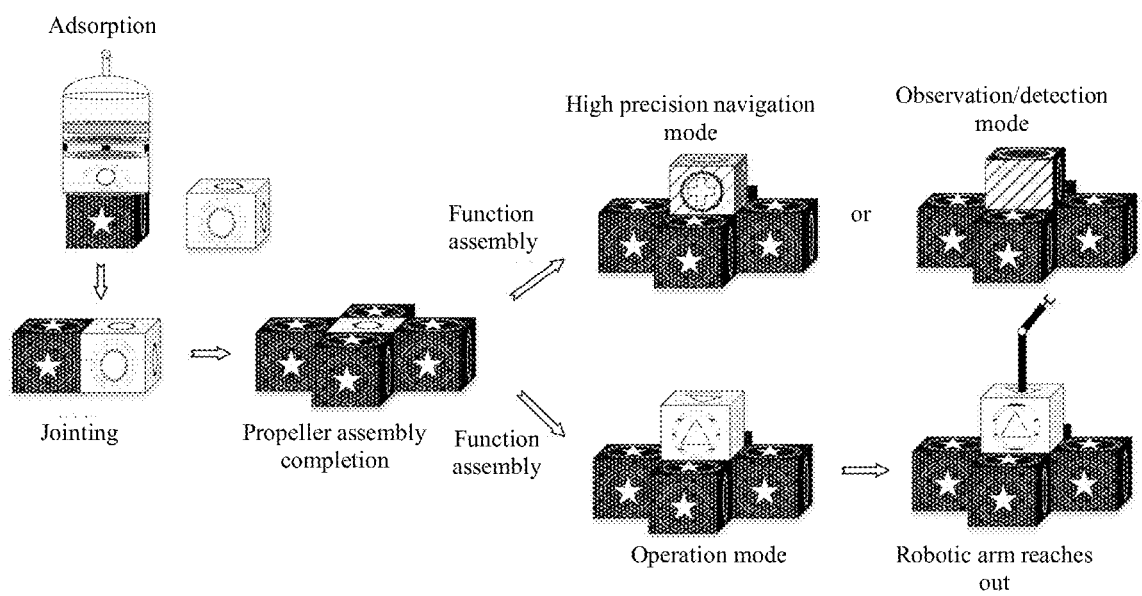
FIG. 2 is a composition diagram of a mode C robot.

A docking and reconstruction manner of the mode B robot 2 is as follows: based on the energy module 9, the four propeller modules 4 are adsorbed and jointed around the energy module successively, of which two are the vertical propellers and two are the horizontal propellers, wherein the propellers of the same type are centrosymmetric about the energy module; and then the navigation control module 7, the observation detection module 10 or the operation tool 8 are jointed at the top of the energy module, which are respectively applicable to a high-precision navigation task, an observation and detection task or a fixed-point operation task. The above steps are shown in FIG. 2.

When the mode B robot 2 completes the task, it can return back through recognizing a cursor 12 of the submarine platform. If the mode B robot 2 later performs the same task, it can be directly docked on the platform for charging. If the mode B robot 2 needs to change a working mode after completing the task, it would dock on the platform first, and then transmit a reconstruction request instruction to the mode C robot 3 through the submarine platform 11. The reconstruction and disassembly steps are as follows:

in a first step, the mode C robot 3 finds a functional module that needs to be disassembled through the visual system, descends to the top of the functional module through the visual servo control, and closes the propeller;

in a second step, the direct current is applied to the coil on the top of the energy module, so that the coil on the top generates a repulsion force and the top functional module is released;

in a third step, the permanent magnet at the bottom of the mode C robot 3 and the permanent magnet of the functional module released by the mode B robot 2 are adsorbed; and in a fourth step, the mode C robot 3 sails to a vacant position of the submarine platform 9 with the functional module and releases it on the submarine platform 9.

Figure 3:
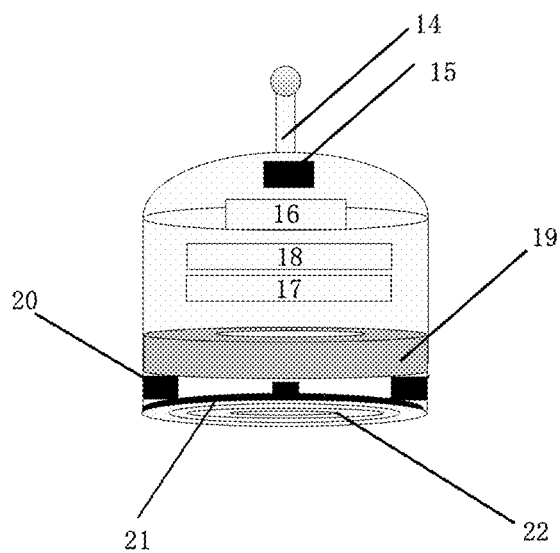
FIG. 3 is a diagram of a docking and reconstruction process of a mode B robot.

As shown in FIG. 3, the most basic units of the mode C robot 3 (excluding functional modules) comprises:

an antenna 14, which is installed on the top of the mode C robot, wherein it transmits information from a submarine test station back to a shore base station when the robot floats to the sea surface;

a vertical propeller 15, which is equipped in a top permeable tank and is configured to regulate a vertical motion of the submarine robot during an assembly task, wherein the task is initiated by the submarine charging platform 11; and a buoyancy regulating system 16, which is equipped in the top permeable tank and is configured to regulate net buoyancy so that the robot floats to the sea surface when the robot is not performing the assembly task and reducing the buoyancy to make the mode C robot 3 sink when the information is transmitted;

a control center 17, comprising a controller and a navigation sensor which support various motions of the mode C robot 3;

an energy and signal manager 18, which is configured to regulate the energy and the signal transmitted by the coil so as to input into the control center;

a battery pack 19, which is configured to power the mode C robot 3;

horizontal propellers 20, which are 3 in total and are installed at an angle of 120° to control the horizontal motion of the mode C robot 3;

a permanent magnet 21, which is equipped under the horizontal propeller module and is configured to adsorb the functional module or the energy module, wherein a magnetic pole on the outer side and a magnetic pole of the functional module adsorb each other; and a coil 22, which is equipped under the permanent magnet, wherein the repulsion force opposite to the adsorption force of the permanent magnet is generated when a direct current in a specific direction is applied, so that the functional modules are separated. In addition, when the coil does not generate the repulsive force, it is configured to perform radio energy and signal transmission, so that each module can interact with energy and data synchronously.

Figure 4:
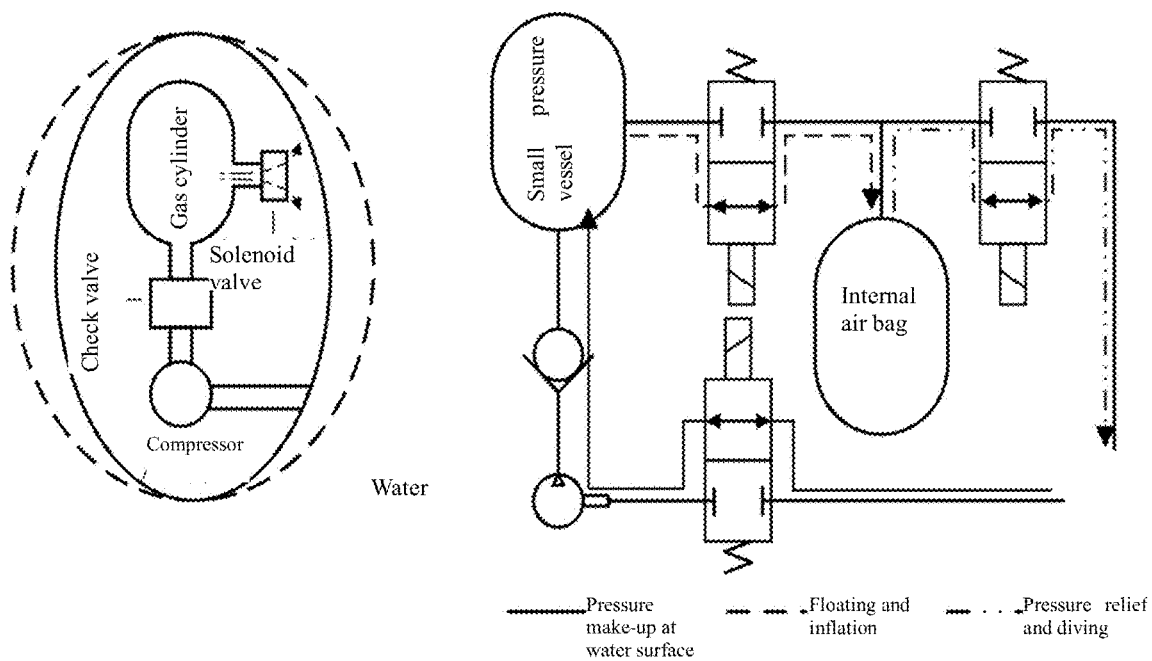
FIG. 4 is a schematic diagram of a buoyancy regulating mechanism of the mode C robot.

As shown in FIG. 4, the buoyancy regulating system 16 of the mode C robot 3 has a flexible air bag to wrap around the system equipment. An outer side of the air bag is directly in contact with water, and the pressure gas cylinder is deflated through the solenoid valve, so that the air bag floats as a drainage volume thereof increases. When it is necessary to dive, gas inside the air bag is discharged. A minimum pressure of the gas cylinder is greater than a maximum working water depth pressure of the mode C robot 3. Therefore, when the pressure of the gas cylinder is lower than a safety threshold, the mode C robot 3 needs to inflate and pressurize the gas cylinder through an air compressor on the water surface.

The above embodiments describe in detail the technical schemes and beneficial effects of the present invention. It should be understood that the above embodiments are only specific embodiments of the present invention and are not used to limit the present invention. Any modification, supplement and equivalent replacement etc. made within the scope of the principle of the present invention shall be included within the protection scope of the present invention.

What is claimed is:

1. A multi-modal robot system capable of realizing autonomous submarine docking and reconstruction, comprising a non-contact charging platform, a plurality of functional modules and a docking robot; wherein:
    a coil is arranged on the non-contact charging platform, and energy and signals are transmitted between the coil and the functional modules;
    a coil and a permanent magnet are arranged in a docking surface of each of the functional modules, and adjacent docking functional modules are adsorbed with each other by the permanent magnets during the docking and reconstruction, and are separated by means of an electromagnetic force which is repulsive to an adsorption force of the permanent magnets and is generated by energizing the coils;
    the functional modules comprise an energy module, a propeller module, an observation/detection module, an operation tool module, a navigation control module, a bow module and a tail module; and
    according to an instruction of a docking and reconstruction task, the docking robot reconstructs a multi-modal underwater robot by docking the plurality of functional modules with specific functions;
    wherein the docking robot comprises a permanent magnet, a control center, and an antenna controlled by the control center, a buoyancy regulating device, an energy and signal manager, a propeller, a coil, and a battery pack, wherein
    the control center comprises a controller and a navigation sensor, and communicates with a shore base station through the antenna, and specific functional modules are docked and reconstructed through coordination of the permanent magnet and the coil according to the instruction of the docking and reconstruction task;
    the buoyancy regulating device is installed in a top permeable tank to regulate buoyancy of the docking robot through a buoyancy force;
    the energy and signal manager is configured to regulate the energy and the signal transmitted by the coil;
    the propeller comprises a vertical propeller and a horizontal propeller, which are configured to regulate a vertical motion and a horizontal motion of the docking robot respectively; and
    the coil transmits the electrical energy and signal when an alternating current is applied thereto, and generates the electromagnetic force opposite to the adsorption force of the permanent magnet when a direct current is applied thereto, and then the functional modules adsorbed by the permanent magnet are separated.

2. The multi-modal robot system capable of realizing autonomous submarine docking and reconstruction according to claim 1, wherein the energy module provides power for the underwater robot; the propeller module provides a vertical or horizontal propulsion force for the underwater robot; the observation/detection module performs environmental monitoring; the operation tool module is configured to perform a submarine operation of the underwater robot; the navigation control module gives location information of the underwater robot in real time, and performs task planning and control on the underwater robot; the bow module is configured to construct a head of a torpedo-type robot; and the tail module is configured to construct a tail of the torpedo-type robot.

3. The multi-modal robot system capable of realizing autonomous submarine docking and reconstruction according to claim 1, wherein a standby controller is provided inside each of the functional modules; and when other functional modules dock the energy module, the standby controller is waked up.

4. The multi-modal robot system capable of realizing autonomous submarine docking and reconstruction according to claim 1, wherein at least 3 horizontal propellers exist in the docking robot, which are uniformly distributed around an axis of the docking robot.

5. The multi-modal robot system capable of realizing autonomous submarine docking and reconstruction according to claim 1, wherein the buoyancy regulating device comprises a flexible air bag and a pressure gas cylinder wrapped in the flexible air bag, a mouth of the pressure gas cylinder is equipped with a first solenoid valve, the flexible air bag has an exhaust port, and the exhaust port is equipped with a second solenoid valve.

6. The multi-modal robot system capable of realizing autonomous submarine docking and reconstruction according to claim 1, wherein a method for autonomous docking and reconstruction comprises:
    (1) after receiving an instruction of the docking and reconstruction task, the docking robot is guided to approach the platform through a sound beacon of the non-contact charging platform;
    (2) with assistance of a visual system, the docking robot looks for a specified functional module, and after finding the module, the docking robot performs a visual servo descent control until a depth thereof is unable to change any more;
    (3) the docking robot transmits a high-frequency modulation signal through the coil, and a coil of the specified functional module receives an induced magnetic field and generates an induced voltage; the permanent magnet of the docking robot and a permanent magnet of the specified functional module adsorb each other; the adsorption is considered to be in place when the induced voltage reaches a specific value, and the functional module returns an adsorption-in-place signal through the coil; and the docking robot moves the adsorbed functional module to a specified location and closes the propeller;

(4) the docking robot applies the direct current to the coil to generate the electromagnetic repulsion force so as to separate the adsorbed functional module and look for a next functional module to be assembled; and (5) steps (2)-(4) are repeated until the docking and reconstruction of each functional module of a specified modal robot is completed.

7. The multi-modal robot system capable of realizing autonomous submarine docking and reconstruction according to claim 1, wherein a multi-modal robot capable of realizing autonomous docking and reconstruction comprises:
   a cruise robot, which is configured to perform a wide range of cruise tasks;
   a fixed-point hovering robot, which is configured to perform a fixed-point hovering operation; and
   a vertical profiling robot, which is configured to perform a profiling detection task.

8. The multi-modal robot system capable of realizing autonomous submarine docking and reconstruction according to claim 7, wherein the cruise robot comprises the bow module, a first vertical propeller module, the navigation control module, the energy module, a second vertical propeller module and the tail module that are docked in turn; and a docking and reconstruction manner of the cruise robot is as follows: based on the energy module, the navigation control module, the vertical propeller module, the bow module and the tail propulsion module are adsorbed successively.

9. The multi-modal robot system capable of realizing autonomous submarine docking and reconstruction according to claim 7, wherein the fixed-point hovering robot comprises:
   an energy module;
   four propeller modules adsorbed around the energy module, each of the propeller modules comprising two vertical propellers and two horizontal propellers, wherein the propellers of the same type are centrosymmetric about the energy module; and
   a navigation control module, an observation/detection module or an operation tool module adsorbed at a top of the energy module, wherein
   a docking and reconstruction manner of the fixed-point hovering robot is as follows: based on the energy module, the four propeller modules are adsorbed and jointed around the energy module successively, of which two are the vertical propellers and two are the horizontal propellers, wherein the propellers of the same type are centrosymmetric about the energy module; and then the navigation control module, the observation/detection module or the operation tool module are jointed at the top of the energy module.

* * * * *